Nov. 26, 1963  T. B. EDDY  3,111,751
POWER INSERTING TOOL
Filed Oct. 16, 1961
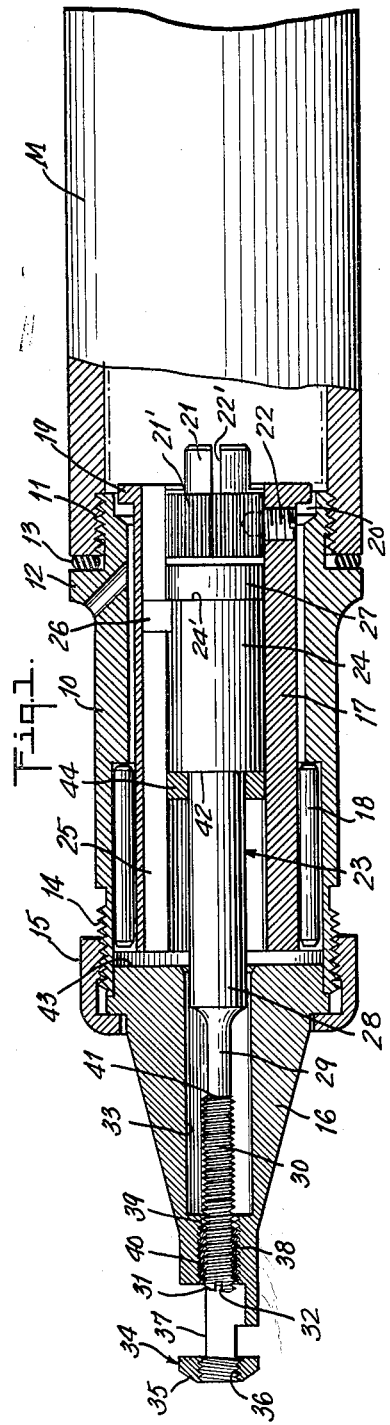
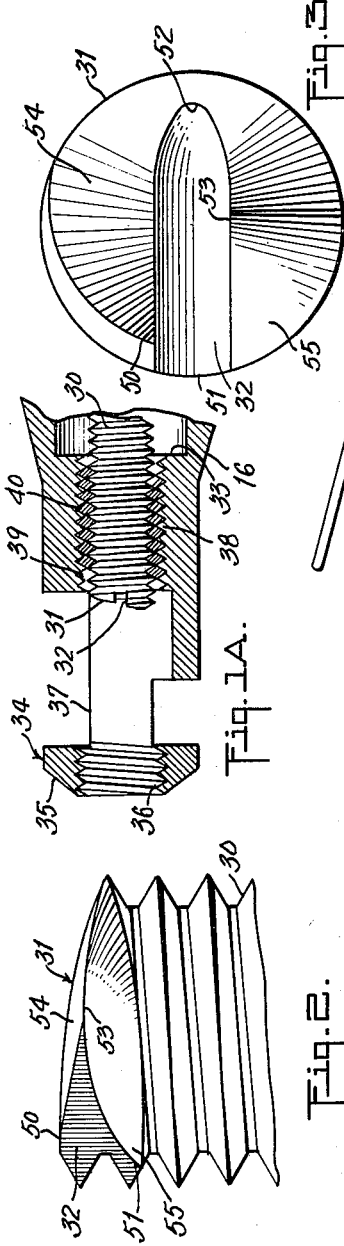
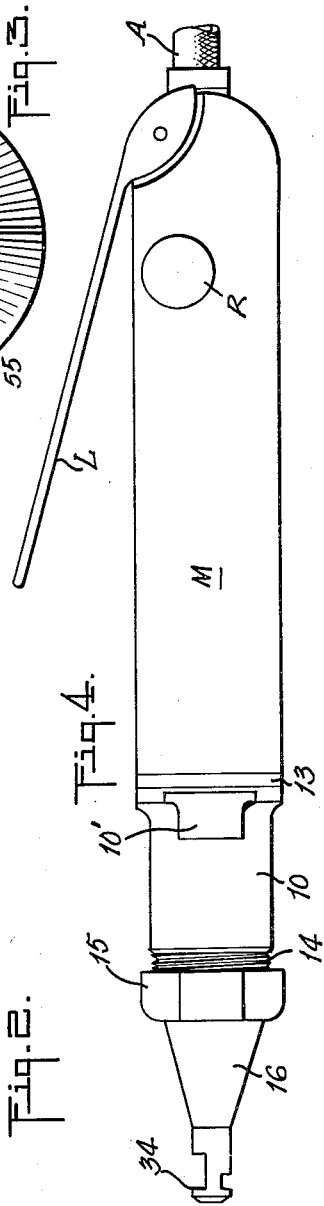
INVENTOR.
THEODORE B. EDDY
BY Walter S. Pleston
ATTORNEY

United States Patent Office 3,111,751
Patented Nov. 26, 1963

3,111,751
POWER INSERTING TOOL
Theodore B. Eddy, Brookfield, Conn., assignor to Heli-Coil Corporation, Danbury, Conn., a corporation of Delaware
Filed Oct. 16, 1961, Ser. No. 145,392
3 Claims. (Cl. 29—240.5)

The invention relates to a power driven tool for installing a wire screw thread insert in a tapped hole of a work piece. Tools of this kind are conventionally provided with a prewinder for contracting originally oversized coils to a smaller diameter whereby the installation of an insert in the tapped hole is made possible or at least facilitated.

However, with the tools of the conventional type it frequently happens that convolutions of the insert rather than properly engaging the thread groove of the prewinder cross the thread of the latter. Furthermore, where the insert-installing mandrel of a conventional tool is helically advanced the mandrel is temporarily disengaged from the guiding helix and difficulties are encountered upon the reengagement thereof.

The invention aims to avoid the mentioned drawbacks and to provide a tool for the indicated purpose in which the inserting mandrel is permanently guided for helical movement by a nut thread in such a manner that it is all the time in a proper relationship to the thread of the prewinder of the tool.

The invention further aims to provide a tool adapted to be directly coupled to a reversible prime mover such as an air motor, and equipped with an interchangeable prewinder and with a mandrel which is exteriorly threaded at its driving end to receive an insert thereon, the mandrel being helically guided in a nut the thread of which though of a pitch equal to that of the prewinder is one half pitch out of phase with the prewinder thread, so that the inner thread forming portion of the insert passing through the prewinder is in perfect lead with the thread of the nut.

Another object of the invention is the provision of a tool of the mentioned type wherein the movement of the mandrel is stopped in both directions by abutments and wherein the distance the mandrel can travel is adjustable.

Further objects and details of the invention will be apparent from the description given hereinafter and the accompanying drawing illustrating an embodiment thereof by way of example.

In the drawing:
FIG. 1 is a longitudinal cross-section of a tool according to the invention with the mandrel in its retracted position,
FIG. 1a is portion of FIG. 1, on an enlarged scale,
FIG. 2 is a side elevation of the mandrel front end,
FIG. 3 is a front view of the mandrel end, and
FIG. 4 is a side elevation of the tool connected to a reversible air motor.

Referring now to the drawing, the tool comprises a substantially tubular housing 10, which at its rear end is provided with an exterior thread 11 for engagement with the stationary part of a prime mover M preferably of the type of an air motor. An air motor is selected in connection with the present invention because such motor can be stalled due to jamming while driving an insert, as it will be explained later on, and yet none of the rotary parts would be subject to damage. The housing may be provided with flat faces 10' (see FIG. 4) for the application of a wrench when the housing is to be screwed on the motor. A flange-like projection 12 between the thread 11 and the main body of the housing 10 retains a gasket 13 interpositioned between the flange 12 and the prime mover. The forward end of the housing is also provided with an exterior thread 14 engaged by a cap nut 15 which connects the prewinder body 16 interchangeably to the housing 10. Interiorly of the latter a drive-sleeve 17 is journaled in an anti-friction bearing preferably a needle bearing 18. The rearward end of the sleeve 17 has a flange 19 located in a recessed portion 20 of the housing and bearing against a rotating part of the motor M. Interiorly of the rearward end of sleeve 17 a coupling member 21 forming a bottom of the sleeve is secured by means of a longitudinally knurled face 21' and a set screw 22. It is provided with grooves 22' in order to be connected by keys (not shown) to the rotating motor part. A mandrel in general denoted by 23 is guided with its rather big head 24 within the drive sleeve 17. The latter has a groove 25 throughout its length into which a lateral projection 26 of the mandrel head 24 slidingly engages. Between the rear end face 24' of head 24 and the coupling member 21, a rubber buffer 27 is inserted for a reason to be explained later on. The mandrel has a shank 28 ending in a reduced portion 29 which is exteriorly threaded at 30 over a substantial length extending from the ultimate mandrel end rearward. The end face 31 of the mandrel has a highest point 50 where a slot 32 cuts off the ultimate end convolution of the mandrel thread. Slot 32 extends from its open end 51 diametrical of the mandrel without, however, breaking through to the opposite side at 52. It is imperative that on this side the end convolution of the mandrel is uninterrupted in order to prevent the insert tang from entering the slot from the end 52. On the side of the slot opposite the point 50, the end face 31 has an apex approximately at 53 where the slot wall constitutes a second abutment for a tang when bearing against the wall at the point 50. The face 31 slopes down at 54 from point 50 towards the slot end 52 and the apex 53 slopes down at 55 to the slot end 51. A preferred form of the mandrel end is shown in FIGS. 2 and 3 and more fully described in my co-pending application Serial No. 145,391 filed simultaneously with the present application.

The body 16 of the prewinder, which is substantially of the type also disclosed in the aforementioned application, has an axial bore 33 wide enough so that the prewinder shank 28 can move therein. The ultimate end of the body 16 is formed by the prewinder foot 34 which may have a tapered front face 35 with which it can engage the countersunk face of the tapped hole of a work piece. The inner thread 36 of the foot 34 corresponds to the size to which the outer thread forming portion of the insert has to be contracted for its installation. In the rear of the foot 34 a laterally open recess 37 is provided for the reception of an insert (not shown) to be installed with the aid of the tool, and between the recess 37 and bore 33 a nut 38 is formed. For this purpose an inner thread 39 is tapped exactly of the same form and pitch and exactly in lead with the thread 36 of the prewinder foot 34. In order to ensure the exact likeness and lead of the threads 36 and 39 it is recommended to produce both in one step of operation. An insert 40 exactly of the type to be installed by the tool is inserted in the thread 39. This insert will now form an inner thread portion which is one half pitch out of lead or phase with the thread 36 and will correspond exactly to an insert contracted by the prewinder foot 34. Complementary to that inner thread portion the outer mandrel thread 30 is formed and the threaded portion 30 is of such extension that the end 31 is close to the rear end of the recess 37 when the mandrel head 24 abuts against the buffer 27, and that the other end 41 of the thread 30 is still in engagement with the nut 38—40, when the forward face 31 of the mandrel projects the greatest predetermined distance from the prewinder foot, i.e. when the forward face 42 of the mandrel head abuts against the rear face 43 of the prewinder body 16. This defines the maximum depth to which an insert can be installed with the tool. In order to reduce the distance the mandrel can be projected, one or several distance rings 44 can be placed on the mandrel shank 28 so that an abutment of the ring or rings against the faces 42 and 43 limits the outward movement of the mandrel. The face 43 will also limit any axial shift of the drive sleeve should such shift occur during the operation of the tool.

The tool will be used in the following manner: The tool will first be connected to the air motor as shown in FIG. 4. An insert will then be put in the recess or chamber 37 with its usual diametrical end tang adjacent the foot 34. Thereupon the assembly will be placed on the work piece coaxial with the tapped thread to be lined with the insert. By depressing the forward lever L of the motor which is to be connected at A to a compressed air source, the sleeve 17 will be rotated. The mandrel will be taken along by the projection 26 in groove 25 and will be screwed forward owing to its engagement with the nut thread 40. The threaded mandrel end will enter and engage the convolutions of the insert in the chamber 37 until the tang enters the slot 32. Thereupon the insert will be rotated with and by the mandrel and screwed through the prewinder foot until the mandrel head or ring 44 abuts against the face 43. This stops the mandrel movement and stalls the motor M. When the operator pushes the reverse button R the reversing torque will screw the mandrel backward whereby the slopes 54 and 55 of the mandrel end face permit the mandrel to become disengaged from the tang of the insert which stays installed in the work piece. The return movement of the mandrel continues until the latter hits the buffer which prevents a wedging of the mandrel and ensures that a subsequent forward movement can start unhampered.

It will be apparent to those skilled in the art that many alterations and modifications of the structure shown and described may be made without departure from the spirit and essence of the invention which for that reason shall not be limited but by the scope of the appended claims.

I claim:

1. A power inserting tool for a wire coil insert having inner and outer screw thread forming portions and a grip forming tang at one of its ends, said tool comprising a reversible air motor, a tubular housing secured with its rear end to the stator of said motor, a drive sleeve secured to the rotor of said motor and rotatable interiorly of said housing, a hollow prewinder body releasably connected to the front end of said housing, and a mandrel movable interiorly of said sleeve and said prewinder body; said prewinder body including an interiorly threaded foot portion and a nut portion at opposite ends respectively of a charging chamber, the threads of said foot and said nut corresponding to the outer and inner threads respectively of an insert when contracted by said tool; said mandrel being slotted in its ultimate free end and including a threaded end portion of a length sufficient to ensure its permanent engagement with said nut, said mandrel further including a head permanently connected with said sleeve for common rotation but axially shiftable within the latter, the opposite ends of said head forming first abutment faces for engagement with corresponding second abutment faces, respectively, provided substantially near the ends of said sleeve so as to limit the stroke of the mandrel in the axial direction and to stall the motor when a pair of first and second abutment faces engage one another.

2. A tool as in claim 1, wherein said sleeve has a bottom at its rear end, further comprising a rubber bumper in said sleeve between said bottom and said mandrel head.

3. A tool as in claim 1, said mandrel including between said head and said threaded end portion a shank of a diameter at least as large as the outer diameter of said end portion, said tool further comprising an interchangeable spacer ring on said shank between said mandrel head and said second abutment face at the front end of said sleeve.

References Cited in the file of this patent

UNITED STATES PATENTS

| | | |
|---|---|---|
| 2,360,047 | Caminez | Oct. 10, 1944 |
| 2,371,622 | Hawkins | Mar. 20, 1945 |
| 2,997,782 | Eddy | Aug. 29, 1961 |
| 3,052,972 | Steinmeyer | Sept. 11, 1962 |